United States Patent [19]

Yamazaki

[11] Patent Number: 4,596,104
[45] Date of Patent: Jun. 24, 1986

[54] JOINT STRUCTURE FOR A STRUCTURAL BAR ASSEMBLY

[76] Inventor: Keiichiro Yamazaki, No. 12-1, 6-chome, Kameido, Koutou-ku, Tokyo-to, Japan

[21] Appl. No.: 784,222
[22] Filed: Oct. 4, 1985

[30] Foreign Application Priority Data

Oct. 18, 1984 [JP] Japan .................. 59-157664[U]
Nov. 6, 1984 [JP] Japan .................. 59-168210[U]

[51] Int. Cl.$^4$ ................ E04C 2/42; B25G 3/00
[52] U.S. Cl. .................... 52/664; 403/346
[58] Field of Search ............ 52/664, 280, 284, 286, 52/272; 403/346, 347, 400, 386; 29/428, 455 R

[56] References Cited

U.S. PATENT DOCUMENTS

| 2,617,502 | 11/1952 | Kessler | 403/346 X |
| 3,218,036 | 11/1965 | Kozub | 403/347 X |
| 3,927,950 | 12/1975 | Herrmann et al. | 403/346 |
| 4,406,048 | 9/1983 | Bailey | 403/283 X |

FOREIGN PATENT DOCUMENTS

| 553010 | 12/1956 | Belgium | 403/346 |
| 316958 | 12/1919 | Fed. Rep. of Germany | 403/346 |
| 2433806 | 1/1976 | Fed. Rep. of Germany | 403/346 |

Primary Examiner—J. Karl Bell
Attorney, Agent, or Firm—Martin Smolowitz

[57] ABSTRACT

A joint structure for a structural bar assembly, wherein a first bar and a hollow second bar are assembled by inserting of fitting a web of the first bar into a transverse slot of the second bar, and by restoring a stopper plate of the web elastically or forcibly to an upwardly inclined state so as to allow a top end of the stopper plate to engage or contact with an inner surface of a front wall of the second bar after the stopper plate passes through the slot. Joint portions of the first bar and the second bar are not pressed or hit strongly. There is no fear of rusting and eroding in the joint portions owing to injury of plating or painting layers.

4 Claims, 27 Drawing Figures

JOINT STRUCTURE FOR A STRUCTURAL BAR ASSEMBLY

DETAILED DESCRIPTION OF THE INVENTION

The present invention relates to a joint structure of a bar assembly used in civil engneering and construction.

Such a structural bar assembly comprises a first bar disposed horizontally in general and a second bar disposed vertically in general, which are joined crosswise or slantingly each other. The bar assembly may be attached to houses and buildings inside or outside thereof, or be installed around sites of houses, buildings, parks, athletic grounds, workshops and the like, or be installed along roads, ponds, lakes, rivers and the like. More particularly, said constructural bar assembly includes a kind of a railing such as a window railing, a stair railing, a balcony railing a bridge railing and the like, a kind of a lattice such as a window lattice, a lattice door, a partition lattice and the like, and a kind of a fence or paling for partitioning or protecting house sites, pastures, farms, flower beds, gardens, turfs, parks, roads, rivers, ponds, lakes and the like.

In the prior art, the first bar and the second bar are joined or assembled with using conventional fixing members such as set screws and rivets, so that much labor and skillful workers are required for assembling, and it is difficult to decrease a total assembling cost.

There is proposed a press-fixing method in the U.S. Pat. Nos. 3,002,582, 3,345,730 and 4,406,048, wherein a joint portion of the first bar is fitted or inserted into a through slot formed on the second bar, and then the joint portion is flatly transformed by strongly pressing or hitting it so as not to slip out from the through slot.

However, although such method does not require additional material cost for fixing members such as screws and rivets and also much labor for assembling operations, it causes joint portions to gather rust and erosion, as plating and painting layers on the joint portions are largely and deeply injured by a strong pressing or hitting process.

Therefore, it is an object of the present invention to provide a joint structure for constructural bar assembly which does not have any fear of rusting and eroding in joint portions owing to injury of plating or painting layers, so that a sufficient joint strength can be kept for a relatively longer period of time.

Another object of the present invention is to provide a joint structure for bar assembly which does not require so much labor and material cost for fixing members.

A feature of the present invention is that a first bar and a second bar are assembled each other only by inserting or fitting operations without strongly hitting or pressing surfaces of joint portions and also without using costly fixing members such as rivets and set screws.

More particularly, a joint structure of the present invention comprises a first bar and a hollow second bar to be crosswise or slantingly joined each other, a web formed longitudinally on a rear wall of the first bar, a through slot formed transversely on a front wall of the second bar, an inclined stopper plate formed on a web portion of said web by cutting and bending operations, said stopper plate being acclivitous toward the rear wall of said first bar, an edge portion of the slot or the stopper plate being elastically transformed or bended so as to allow the stopper plate to pass through the slot when the web portion is fitted into the slot, and a top end of the inclined stopper plate being engaged or contacted with an inner surface of the front wall of the second bar after the stopper plate passes through the slot.

Other objects, features and advantages of the present invention will become apparent from following description done with referring to accompanying drawings. In the drawings.

Figure 1:
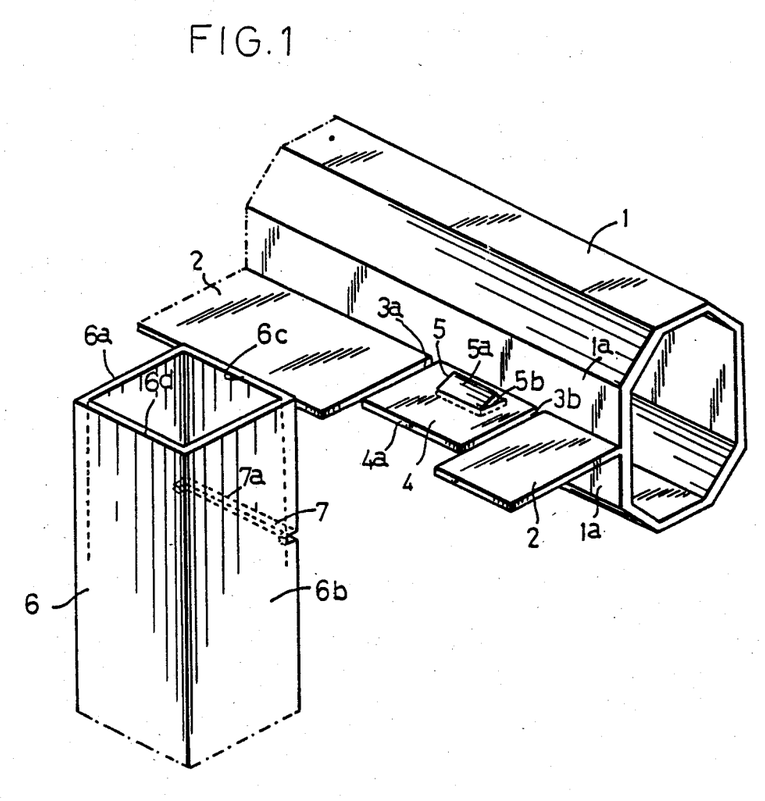
FIG. 1 is a perspective view of a first bar and a second bar before assembling, which shows an embodiment of the present invention.
Figure 2:
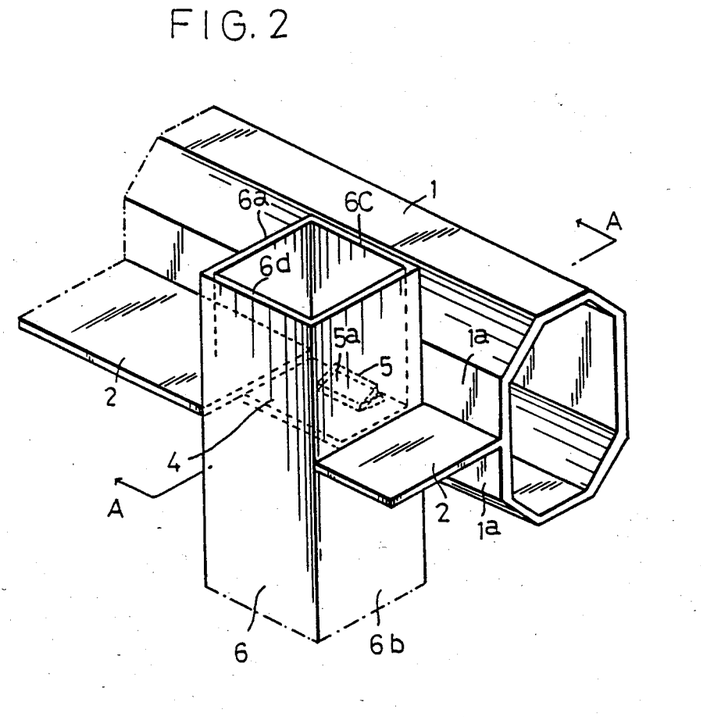
FIG. 2 is a perspective view of the first bar and the second bar of FIG. 1 after assembling.
Figures 3, 4, 5:
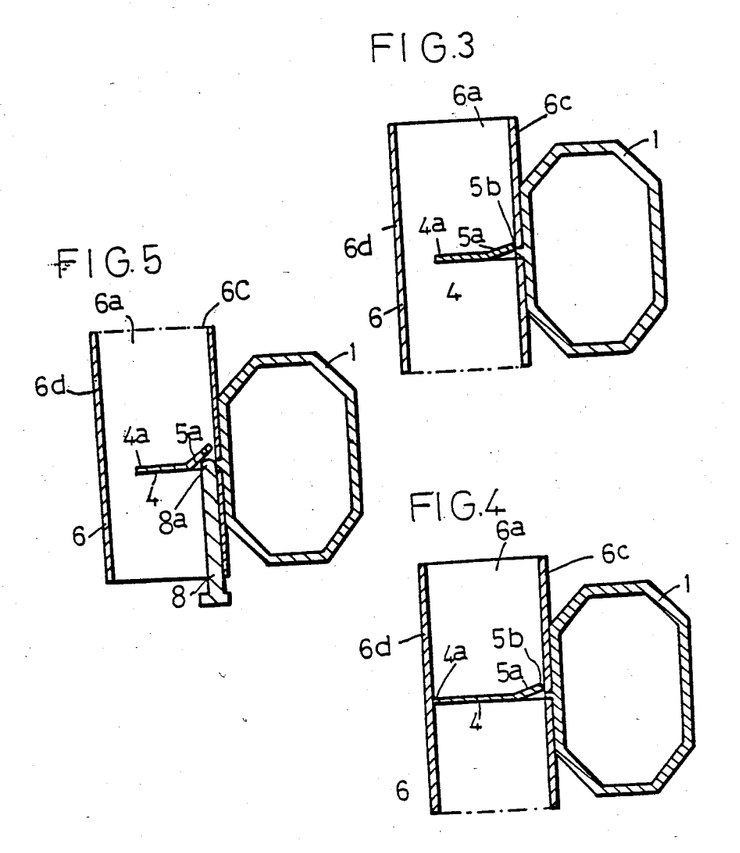
FIG. 3 is a sectional view taken along a line A—A of FIG. 2.
FIG. 4 is a sectional view of assembled first and second bars, which shows another embodiment of the present invention, wherein a top end of a web portion is contacted with a rear wall of a second bar.
FIG. 5 is a sectional view of assembled first and second bars, which shows a further embodiment of the present invention, wherein a tool is inserted into a second bar for pushing a stopper plate.

Referring to FIGS. 1 to 3 which shows a preferable embodiment of the present invention, a first bar 1 and a second bar 6 are constituted by a pipe member, and a web 2 is formed on a rear wall 1a of the first bar 1 at full length of the first bar. The web 2 is located at a center position of the rear wall 1a. A pair of transverse slits 3a, 3b are formed on the web 2 at a space which is substantially equal to a full width of the second bar 6. An inclined stopper plate 5 is formed on a web portion 4 defined between the slits 3a, 3b. The stopper plate 5 is acclivitous toward said rear wall 1a, namely, it is upwardly inclined in a direction of a rear end 4a of the web portion 4 to the rear wall 1a of the first bar 1. A through slot 7 is transversely formed on a front wall 6c of the second bar 6 at a full width of the second bar 6.

In a case of the above embodiment, the first bar 1 and the second bar 6 are assembled crosswise by fitting or inserting the web portion 4 into the slot 7 with contacting left and right side walles 6a, 6b to edges of said left and right slits 3a, 3b. On this fitting operation, as a traverse extending edge 7a of the slot 7 is slidably contacting to an inclined surface 5a of the stopper plate 5, the palte 5 is elastically transformed or bended downwardly so as to pass through the slot 7.

When the front wall 6c of the second bar 6 comes into contact with the rear wall 1a of the first bar 1, the stopper plate 5 is completely passed through the slot 7, and at once elastically restored to an upwardly inclined state. In this way, as a top end 5b of the stopper plate 5 comes into contact with an inner surface of the front wall of the second bar 6, the stopper plate 5 is prevented from slipping out from the slot 7. Namely, the second bar 6 is prevented from moving forward and rearward in relation to the first bar 1. Also, as the edges of said slits 3a, 3b of the web 2 contact with the side walls 6a, 6b of the second bar 6, the second bar 6 is prevented from moving right and left against the first bar 1. Furthermore, the second bar 6 is prevented from moving upward and downward, as the web portion 4 of the first bar 1 is engaged with the slot 7 of the second bar 6. Thus, the first bar 1 and the second bar 6 are firmly joined and kept in a proper assembling state for a long period of time.

In a case of another embodiment shown in FIG. 4, as a top end 4a of a web portion 4 contacts with an inner surface of a rear wall 6d of a second bar 4, it is possible to provide a more firmly joined bar assembly.

In a case of other embodiment shown in FIG. 5, an instrument or tool 8 is additionally used for restoring a stopper plate 5 of a first bar 1, if the stopper plate 5 does not restore elastically at all or restores incompletely owing to material nature and quality of a web 2 of the first bar 1. After the stopper plate 5 passes through a slot 7 of a second bar 6, the tool 8 is inserted longituidinally into the second bar 6, and a head 8a of the tool 8 pushes the stopper plate 5 upwardly so as to protrude slantingly over a web portion 4. In this way, as a top end 5b of the slanted stopper plate 5 engages with an inner surface of a rear wall 6c of the seconda bar 6, the stopper plate 5 is prevented from slipping out from the slot 7.

Figure 6:
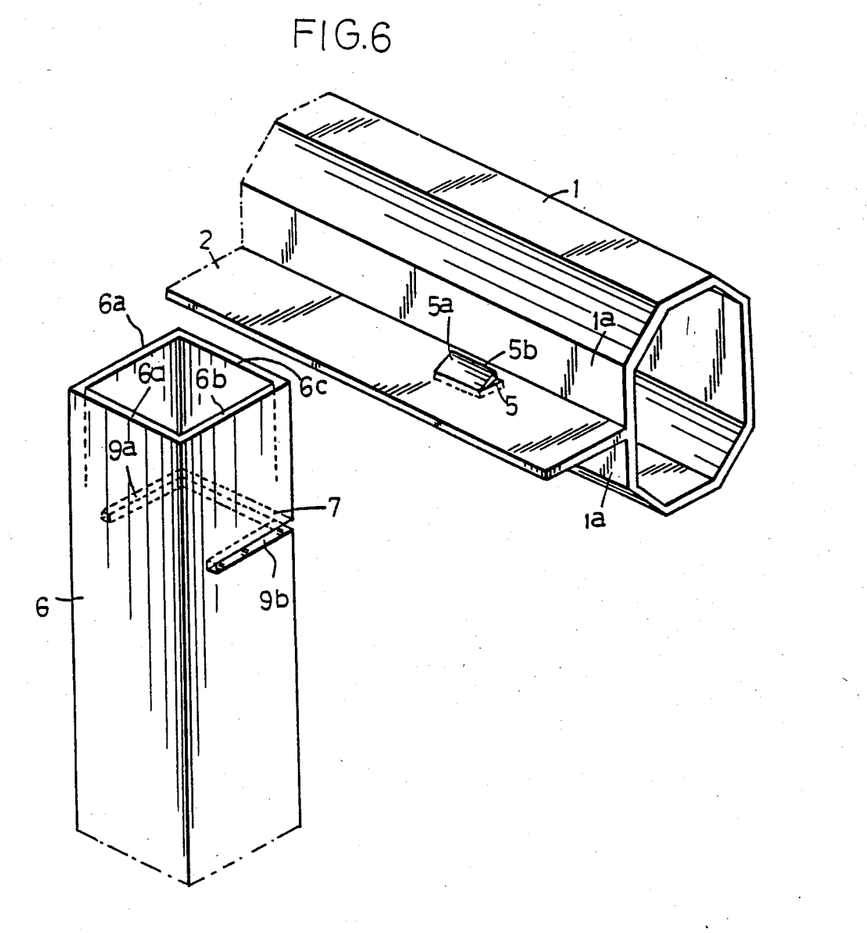
FIG. 6 is a perspective view of a first bar and a second bar before assembling, which shows other embodiment of the present invention.
Figure 7:
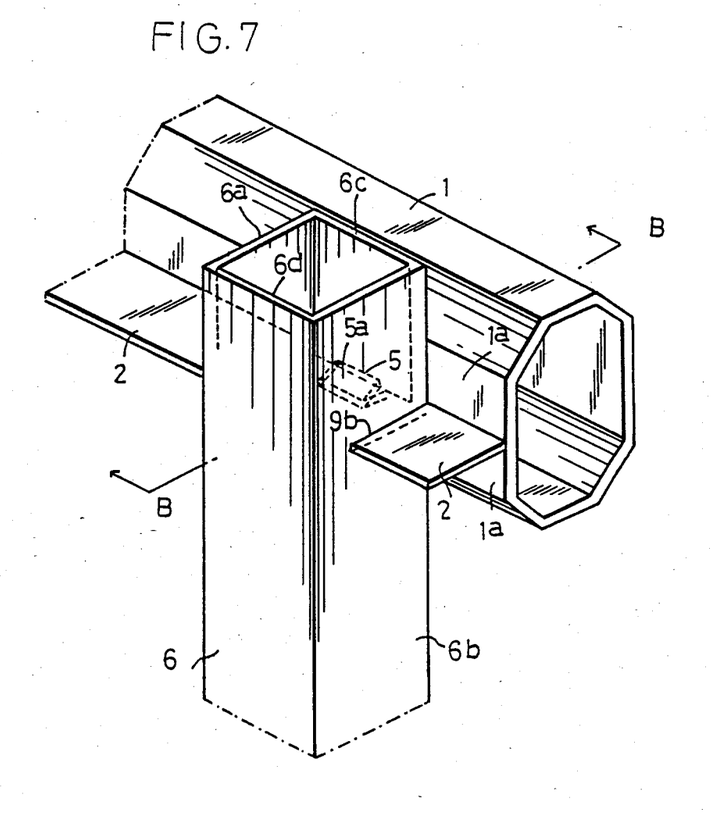
FIG. 7 is a perspective view of the first bar and the second bar of FIG. 6 after assembling.
Figure 8:
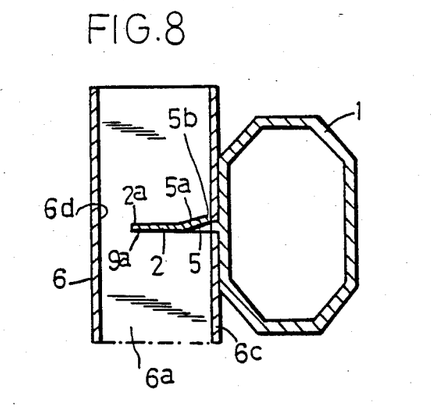
FIG. 8 is a sectional view taken along a line B—B of FIG. 7.

In a case of other embodiment shown in FIGS. 6 to 8, a web 2 is longitudinally formed on rear wall 1a of a first bar 1, and the web 2 does not have tarnsverse slits for receiving side walls 6a, 6b of a second bar. On the other hand, a trancverse slot 7 is formed on full width of a front wall 6c of the second bar 6, and elongated side slits 9a, 9b are formed on side walls 6a, 6b of the second bar 6. The side slits 9a, 9b communicate with the slot 7 and extend to a center portion of the side walls 6a, 6b for receiving the web 2 entirely.

In this embodiment, the first bar 1 and the second bar 6 are assembled crosswise by fitting or inserting a stopper plate 5 of the web 2 into a slot 7 of the second bar 6 with contacting the web 2 to edges of said side slits 9a, 9b. During such fitting operation, as a traverse extending edge 7a of the slot 7 slidably pushing an inclined surface 5a of the stopper plate 5, the palte5 is elastically transformed or bended downwardly so as to pass through the slot 7. When the front wall 6c of the second bar 6 comes into contact with the rear wall 1a of the first bar 1, the stopper plate 5 is completely passed through the slot 7, and at once elastically restored to an upwardly inclined state.

In this way, as a top end 5b of the stopper plate 5 comes into contact with an inner surface of the front wall 6c, the stopper plate 5 is prevented from slipping out from the slot 7. Namely, the second bar 6 is prevented from moving forward and rearward in relation to the first bar 1. Also, as the second bar 6 is prevented from moving upward and downward, as the web portion 4 of the first bar 1 is engaged with the side slits 9a, 9b of the second bar 6.

Figure 9:
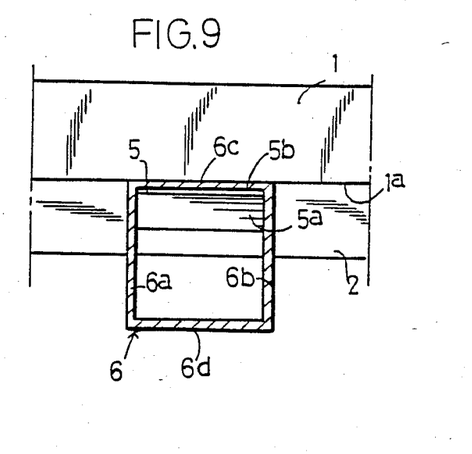
FIG. 9 is a plan view of assembled first and second bars, which shows a further other embodiment of the present invention, wherein a stopper plate contacts with side walls of the second bar.

In a case of a further embodiment shown in FIG. 9, in addition to the above arrangement, as width of a stopper plate 5 of a first bar 1 is almost equal to that of a front wall 6c of a second bar 6, the stopper plate 5 can contact with inner surface of side walls 6a, 6b of the second bar 6. Therefore, the second bar 6 is further prevented from moving left and right against the first bar 1, and a more firmly joined bar assembly is provided.

Figure 10:
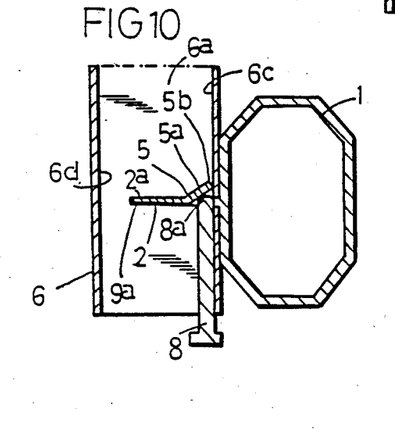
FIG. 10 is a sectional view of assembled first and second bars, which shows a further embodiment of the present invention, wherein a tool is inserted into a second bar for pushing a stopper plate.

In a case of other embodiment shown in FIG. 10, an instrument or tool 8 is additionally used for restoring a stopper plate 5 of a first bar 1, if the stopper plate 5 does not restore elastically at all or restores incompletely owing to material nature of a web 2 of the first bar 1. After the web 2 is fitted into a pair of side slits 9a, 9b completely and the stopper plate 5 passes through a slot 7 of a second bar 6, the tool 8 is inserted longituidinally into the second bar 6, and a head 8a of the tool 8 pushes the stopper plate 5 upwardly so as to be bended slantingly over a web portion 4. In this way, as a top end 5b of the slanted stopper plate 5 engages with an inner surface of a rear wall 6c of the second bar 6, the stopper plate 5 is prevented from slipping out from the slot 7.

Figure 11:
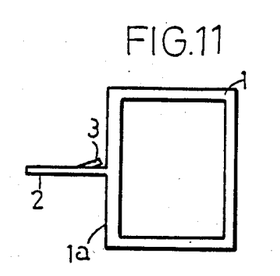
FIGS. 11 to 15 are right side views of first bars of different embodiments of the present invention.
Figure 12:
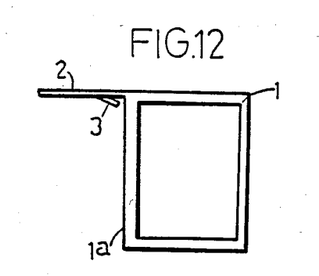
Figure 13:
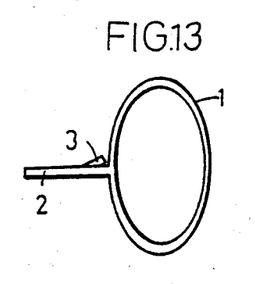
Figure 14:
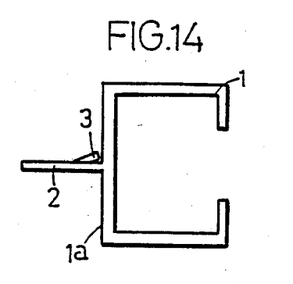
Figure 15:
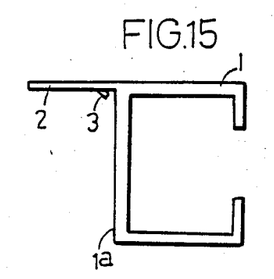

In an embodiment shown in FIG. 11, a first bar 1 is made of a square pipe, and a web 2 is formed on a central portion of a rear wall 1a at a right angle thereto. In an embodiment shown in FIG. 12, a first bar 1 is made of a square, and a web 2 is formed on an edge portion of a rear wall 1a at a right angle thereto. In an embodiment shown in FIG. 13, a first bar 1 is made of an elliptical pipe, and a web 2 is formed on a central portion thereof. In an embodiment shown in FIG. 14, a first bar 1 is made of a channell member which is cut out at a central portion of a front wall longitudinally, and a web 2 is formed on a central portion of a rear wall 1a. In an embodiment shown in FIG. 15, a first bar 1 is made of a channell member, and a web 2 is formed on a edge portion of a rear wall 1a at a right angle thereto.

Figure 16:
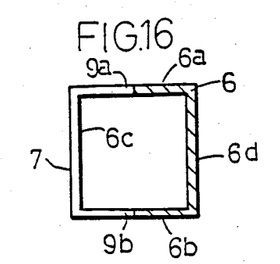
Figure 17:
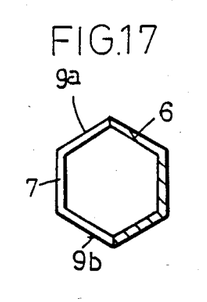
Figure 18:
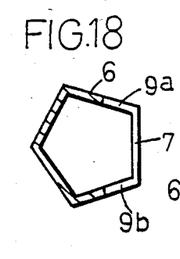
FIGS. 18 to 19 are cross sectional views of second bars of further different embodiments of the present invention.
Figure 19:
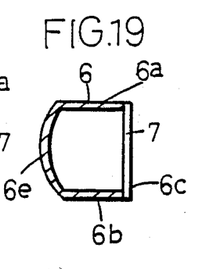

In an embodiment shown in FIG. 16, a second bar 6 is made of a square pipe, and a pair of side slits 9a, 9b communicating with a slot 7 are formed on side walls 6a, 6b. In an embodiment shown in FIG. 17, a second bar 6 is made of a hexagonal, and a pair of side slits 9a, 9b are formed so sa to communicate with a slot 7. In an embodiment shown in FIG. 18, a second bar 6 is made of a pentagonal pipe, and a pair of side slits 9a, 9b and a slot 7 are formed to communicate to each other. In an embodiment shown in FIG. 19, a second bar 6 is made of a square pipe which has a curved rear wall 6d, and a slot 7 is formed on a flat front wall 6c thereof.

Figure 20:
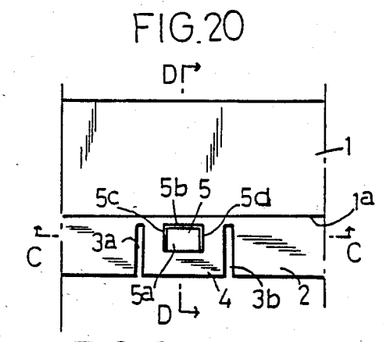
FIG. 20 is a plan view of a first bar of a further other embodiment of the present invention.
Figure 21:
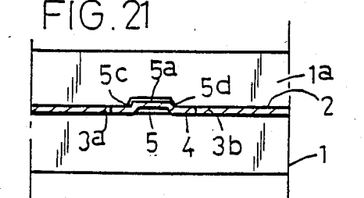
FIG. 21 is a sectional view of the first bar taken along a line C—C of FIG. 20.
Figure 22:
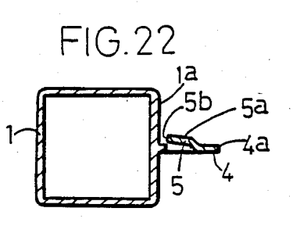
FIG. 22 is a sectional view of the first bar taken along a line D—D of FIG. 20.

In an embodiment shown in FIGS. 20 to 22, a first bar 1 is made of a square pipe, and a pair of slits 3a, 3b are formed on a web 2. Although a rectangular stopper plate 5 is cut away and separated from a web 2 at a side near to a rear wall 1a of the first bar 1 so as to form a top end 5b, a left side 5c and a right side 5d of the stopper plate 5 are not seperated from the web 2, so that the stopper plate 5 is very strong against a bending or buckling load. In this way, a first joint structure of bar assembly can be provided.

Figure 23:
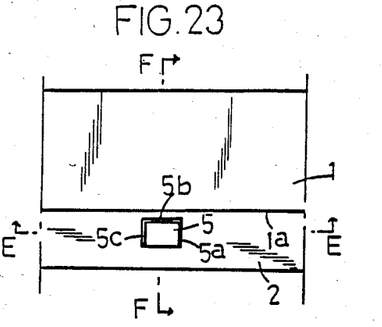
FIG. 23 is a plan view of a first bar of a further other embodiment of the present invention.
Figure 24:
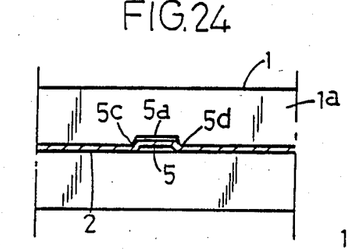
FIG. 24 is a sectional view of the first bar taken along a line E—E of FIG. 23.
Figure 25:
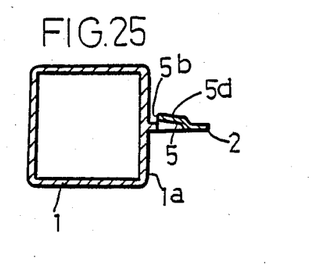
FIG. 25 is a sectional view of the first bar taken along a line F—F of FIG. 23.

In an embodiment shown in FIGS. 23 to 25, a first bar 1 is made of a square pipe, and a pair of slits are not formed on a web 2. Although a rectangular stopper plate 5 is cut from a web 2 at a side near to a rear wall 1a of the first bar 1 in order to form a top end 5b, a left side 5c and a right side 5d of the stopper plate 5 are not seperated from the web 2. Therefore, the stopper plate 5 is a high resistance against a bending or buckling stress, and a more firmly joined bar assembly can be provided. In the above embodiments shown in FIGS. 20 and 23, edge portions of a slot of a second bar may be elastically transformed or bended alone so as to allow the stopper plate 5 to pass through the slot, otherwise the edge portions may be elastically transformed or bended together with the stopper plate 5.

Figure 26:
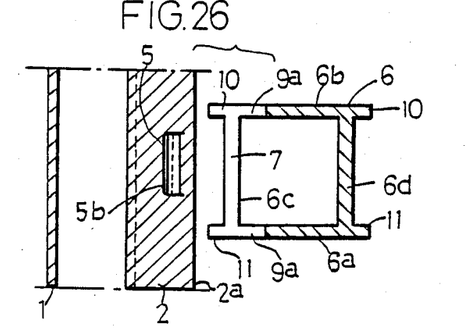
FIG. 26 is a sectional view of unassembled first and second bars of an other embodiment of the present invention; and, FIG. 27 is a sectional view of assembled first and second bars of a further other embodiment of the present invention.

In an embodiment shown in FIG. 26, a second bar 6 has a pair of projections 10, 11 on both edges of a front wall 6c and a rear wall 6d at a right angle thereto. The projection 10, 11 formed on a front wall 6c are contacted with a rear wall 1a of a first bar 1 when the first bar 1 and the second bar 6 are completely assembled.

Figure 27:
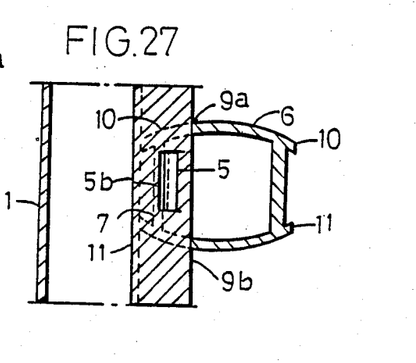

In an embodiment shown in FIG. 27, a second bar 6 has a curved side walls 6a, 6b, and a pair of projections 10, 11 are formed on both edges of a front wall 6c and a rear wall 6d. The projection 10, 11 formed on a front wall 6c are contacted with a rear wall 1a of a first bar 1 when the first bar 1 and the second bar 6 are completely assembled.

It should be noted that the present invention is not restricted to the above-mentioned embodiments and the drawings with regard to cross sectional shapes of a first bar and a second bar, shapes of a web and a stopper plate, numbers of the web and the stopper plate, shapes a slo and a slit, and numners the slot and the slit.

As described above, in the case of the joint structure of the present invention, the first bar 1 and the second bar 6 are assembled by inserting or fitting the web 2 of the first bar 1 into the transverse slot 7 of the second bar 6, and by restoring the stopper plate 5 elastically or forcibly to an upwardly inclined state so as to allow a top end 5b of the stopper plate 5 to engage or contact with an inner surface of the front wall 6c of the second bar 6 after the stopper plate 5 passes through the slot 7. Namely, because joint portions of the first bar 1 and the second bar 6 are not pressed or hit strongly, there is no fear of rusting and eroding in the joint portions owing to injury of plating or painting layers, so that a sufficient joint strength can be maintained for a long period of time.

Also, the first bar 1 and the second bar 5 are joined each other only by inserting or fitting operations without using costly fixing members such as rivets and set screws, the joint structure of the present invention does not require so much labor and a total cost of assembling can be decreased.

What is claimed is as follows:

1. A joint structure for a structural bar assembly comprises a first bar and a hollow second bar to be crosswise or slantingly joined each other, a web formed longitudinally on a rear wall of the first bar, a through slot formed transversely on a front wall of the second bar, an inclined stopper plate formed on a web portion of said web by cutting and bending operations, said stopper plate being acclivitous toward the rear wall of said first bar, an edge portion of the slot or the stopper plate being elastically transformed or bended so as to allow the stopper plate to pass through the slot when the web portion is fitted into the slot, and a top end of the inclined stopper plate being engaged or contacted with an inner surface of the front wall of the second bar after the stopper plate passes through the slot.

2. A joint structure claimed in claim 1, wherein a stopper plate being forcibly restored to a sufficiently inclined state by pushing the stopper plate with a tool driven longitudinally in a second bar.

3. A joint structure claimed in claim 1, wherein a pair of transverse slits being formed on a web of a first bar at a space substantially equal to a width of a second bar, a stopper plate being formed on a web portion between the transverse slits, side walls of the second bar being fitted into the transverse slits when the stopper plate is inserted through a slot of a front wall of the second bar.

4. A joint structure as claimed in claim 2, wherein a pair of transverse slits being formed on a web of a first bar at a space substantially equal to a width of a second bar, a stopper plate being formed on a web portion between the transverse slits, side walls of the second bar being fitted into the transverse slits when the stopper plate is inserted through a slot of a front wall of the second bar.

* * * * *